United States Patent [19]

Ochs

[11] Patent Number: 4,507,892
[45] Date of Patent: Apr. 2, 1985

[54] SPINNER TYPE FISHING LURE

[76] Inventor: Joe A. Ochs, 405 South Summit Ave., Sioux Falls, S. Dak. 57104

[21] Appl. No.: 525,437

[22] Filed: Aug. 22, 1983

[51] Int. Cl.³ .............................................. A01K 85/00
[52] U.S. Cl. .................... 43/42.18; 43/42.2; 43/42.5
[58] Field of Search ............... 43/42.15, 42.16, 42.17, 43/42.18, 42.19, 42.5, 42.2, 42.51, 42.14

[56] References Cited

U.S. PATENT DOCUMENTS

| 2,037,310 | 4/1936 | Bryan | 43/42.18 |
|---|---|---|---|
| 2,653,408 | 9/1953 | Bradley | 43/42.15 |
| 2,895,253 | 7/1959 | Hess | 43/42.15 |
| 3,221,436 | 12/1965 | Mikus | 43/42.17 |
| 3,568,351 | 3/1971 | Perrin | 43/42.18 |
| 4,099,343 | 7/1978 | Enz | 43/42.19 |

FOREIGN PATENT DOCUMENTS

| 208127 | 3/1960 | Austria | 43/42.18 |
|---|---|---|---|
| 486273 | 9/1952 | Canada | 43/42.18 |
| 722875 | 12/1965 | Canada | 43/42.14 |

Primary Examiner—Gene P. Crosby
Attorney, Agent, or Firm—Lucas J. De Koster

[57] ABSTRACT

A fishing lure comprising two bent plates joined together by a wire designed to hold said plates in approximate perpendicular relation to each other. Spinners, or other attention getting devices may be arranged on the wire.

5 Claims, 1 Drawing Figure

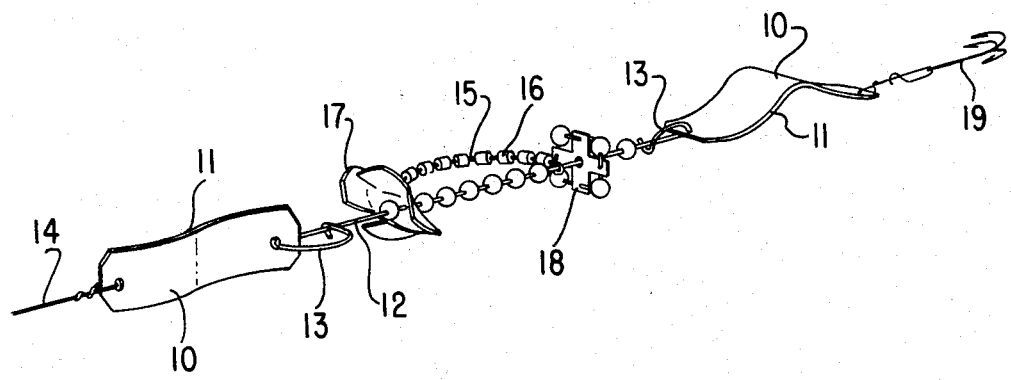

SPINNER TYPE FISHING LURE

BACKGROUND AND SUMMARY OF THE INVENTION

This invention pertains to fishing lures and more particularly to a lure designed by its use of bent plates to provide an unusual wiggling movement in the water.

It is fairly well established that one of the principal functions of an artificial lure used for fishing is simply to get the attention of the fish. This function may be more important with some species of fish than others, but it remains of considerable importance.

Many lures, for example, use spinners of various colors and shapes. Colors are usually bright and flashy so that the bright spinner by its flashy color and spinning agitation will achieve the proper amount of attention-getting.

Other lures are shaped so as to cause peculiar motions as the lure is trolled through the water. Frequently these motions are said to imitate a swimming motion, although few actually do. In general, the motion is a wiggling motion of a solid object rather than the flexible motion of a living body.

My device is not necessarily designed to imitate a swimming motion. It does, however, provide a different wiggling motion that does get attention. In addition, I provide a flexible design for a lure in which various types of attention-getting devices may be inserted between the devices which create the wiggling motion so that the lure can be altered in certain aspects for more effect if desired or necessary.

FIGURES

The FIGURE is a pictorial view of the lure with a beaded spinning mechanism in the intermediate area.

DESCRIPTION

Briefly my invention comprises a fishing lure characterized by having two plates disposed in substantially perpendicular planes. The plates are bent so as to create a surface having a curve at right angles to the direction of motion.

More specifically, and referring to the drawing, I provide a pair of plates 10 which may be formed either of metal or of plastic. These plates are bent to provide a curved surface. The bend 11 is transverse of the plate so that pulling the plate through the water produces a tendency on the part of the plate to move in a direction perpendicular to the plane of the plate.

A stiff wire 12 extending between the plate is formed to provide a hook 13 for each plate. These hooks 13 are arranged so that the plates 10 will be held in planes substantially perpendicular to each other. Thus, if the lure is pulled through the water by a line 14, and if the first plate 10 is substantially vertical, then the following plate will be nearly horizontal. This relationship causes a fluttering or wiggling motion of the first plate in a horizontal direction and of the second plate in a vertical direction. The combination of the two motions creates a considerable stir in the water which will clearly capture the attention of the fish.

In addition to holding the two plates 10, the wire 12 may be elongated to receive a spinner or the like. I have illustrated a beaded device composed of a loop 15 of wire which forms a "D" shaped pattern with the main wire 12. On this wire I use a series of brightly colored beads 16 as attention getters.

If it is desired to gain additional agitation of the water, I can provide a propeller-type spinner 17 to which the D-shaped loop 15 may be attached. A bearing plate 18 at the opposite end of the loop allows the propeller 17 to spin the entire loop 15 in the water thus agitating the water additionally and again seeking the attention of whatever fish may be in the vicinity of the lure.

A simple treble hook 19 may be used to complete the lure. It will be obvious that this hook may be disguised by feathers or a plastic skirt. It would even be possible to attach multiple hooked lures such as those which are designed to imitate fish or the like. Such attachment would seem unnecessary, but certainly is possible.

I claim:

1. A fishing lure comprising a pair of plates, said plates being each formed with a curve in said plate, wire means attached to each plate adapted to hold said plates in substantially perpendicular relationship to each other, the axis of curvature of the curve in each plate being perpendicular to the axis of said wire means, and fish attracting means disposed on said wire means.

2. The device of claim 1 in which said fish attracting means are spinner means rotatably disposed on said wire means.

3. The device of claim 1 in which said fish attracting means are disposed on said wire means.

4. The device of claim 2 in which said spinner means includes propeller means and a substantially D-shaped loop adapted to be spun by said propeller means.

5. The device of claim 4 in which said D-shaped loop includes a wire and beads arranged on said wire.

* * * * *